United States Patent
Uchida et al.

[11] Patent Number: 5,819,777
[45] Date of Patent: Oct. 13, 1998

[54] FLOW CONTROL DEVICE

[75] Inventors: Yukio Uchida, Atsugi; Norihiro Saita, Isehara, both of Japan

[73] Assignee: Unisia Jecs Corporation, Atsugi, Japan

[21] Appl. No.: 674,723

[22] Filed: Jul. 2, 1996

[30] Foreign Application Priority Data

| Jul. 7, 1995 | [JP] | Japan | 7-194079 |
| Sep. 4, 1995 | [JP] | Japan | 7-248282 |
| Sep. 4, 1995 | [JP] | Japan | 7-248283 |
| Apr. 3, 1996 | [JP] | Japan | 8-104746 |

[51] Int. Cl.$^6$ ............................................. B62D 5/06
[52] U.S. Cl. ................. 137/51; 137/115.09; 137/115.11; 137/906
[58] Field of Search .......... 137/115.09, 115.11, 137/51, 115.14, 115.22, 505.14, 906

[56] References Cited

U.S. PATENT DOCUMENTS

| 3,384,020 | 5/1968 | Searle | 137/115.11 X |
| 3,911,947 | 10/1975 | Boxall | 137/505.14 |
| 4,361,166 | 11/1982 | Honaga et al. | 137/117 |
| 4,505,293 | 3/1985 | Strange | 137/115.09 |
| 5,706,849 | 1/1998 | Uchida et al. | 137/115.09 |

FOREIGN PATENT DOCUMENTS 0 077 203  4/1983  European Pat. Off. .

*Primary Examiner*—Stephen M. Hepperle
*Attorney, Agent, or Firm*—Foley & Lardner

[57] ABSTRACT

A flow control device or valve used in a power steering system of an automotive vehicle. The flow control device comprises a housing formed with an axially extending hole in which a spool valve is movably disposed. A first pressure chamber is defined in the hole, with one end of the spool valve. A drain passage is opened to the first pressure chamber and closable with the spool valve. A second pressure chamber is defined in the hole, with the other end of the spool valve. A restricting orifice is provided to be communicated with the first pressure chamber. An introduction passage is formed to be communicated through the restricting orifice with a discharge passage and opened to the first pressure chamber. The pressure in the discharge passage is introduced to the second pressure chamber. A first spring is disposed in the second pressure chamber to bias the spool valve in a direction to close the drain passage. A spring holding member is movably and coaxially disposed in the axially extending hole. The spring holding member has a first end face defining the second pressure chamber, and a second end face which is larger in pressure-receiving area than the first end face. The first spring is disposed between the spool valve and the first end face of the spring holding member. The second end face of the spring holding member defines a pressure control chamber communicated with the second pressure chamber. Additionally, a second spring is provided to bias the spring holding member in a direction to reduce a volume of the pressure control chamber.

12 Claims, 16 Drawing Sheets

FLOW CONTROL DEVICE

BACKGROUND OF THE INVENTION

1. Field of the Invention

This invention relates to improvements in a flow control device or valve, for example, used in a power steering system of an automotive vehicle to control at predetermined levels the flow amount of hydraulic fluid to be supplied from a power source to an actuator of the power steering system.

2. Description of the Prior Art

In a power steering system for assisting a manual steering effort or torque in an automotive vehicle using a hydraulic fluid as a working fluid, a hydraulic fluid pump is usually employed as a power source to supply the hydraulic fluid to an actuator of the power steering system, in which the pump is mounted on the vehicle and driven by an internal combustion engine. Here, in general, the power steering system is required to provide a sufficient and high assisting force for the steering effort during stopping and a low speed cruising of the vehicle, i.e., at low engine speeds of the engine. In other words, it is not required to provide a high assisting force during a high vehicle speed cruising or at high engine speeds in which a road wheel contacting resistance is lower than that during the low vehicle speed cruising. Accordingly, the hydraulic fluid pump whose pump output increases in proportion to the engine speed can not be suitable for the power source of the power steering system as it is.

In view of the above, power steering systems usually employ the following flow amount control of the hydraulic fluid by using a flow control device or valve: The whole amount of the hydraulic fluid discharged from the pump is supplied to the actuator of the power steering system in idling and low engine speed ranges so as to obtain a high assisting force for the steering effort. On the contrary, flow of hydraulic fluid discharged from the pump is restricted by a restricting orifice when the engine speed of the engine increases to a certain level, so that an excessive amount of hydraulic fluid is returned to a hydraulic fluid reservoir.

Additionally, in recent years, flow control devices have been proposed to accomplish such operation that the amount of the excessive hydraulic oil to be returned to the reservoir increases at a neutral position of a steering wheel requiring no steering effort assisting force, thereby reducing the amount of hydraulic fluid to be supplied to the actuator of the power steering system for the purpose of achieving an energy saving.

A flow control device of the above-type is disclosed, for example, in Japanese Patent Provisional Publication No. 6-8840. This flow control device has a flow control valve. The flow control valve includes a spool valve which is movably disposed in a spool valve accommodating hole and defines first and second pressure chambers in the spool valve accommodating hole. A fluid introduction passage which is communicated through a restricting orifice to a fluid discharge passage is opened to the first pressure passage, while a fluid drain passage is open to the first pressure passage. The fluid discharge passage leads to the actuator of the power steering system. Fluid pressure in the fluid discharge passage is introduced into the second pressure chamber. Additionally, a spring is disposed in the second pressure chamber to bias the spool valve in a direction to reduce the volume of the first pressure chamber. Under the action of this flow control valve, a required amount of hydraulic fluid is introduced from the fluid introduction passage through the restricting orifice to the fluid discharge passage, while an excess amount of hydraulic fluid relative to the required amount is returned to the reservoir through the drain passage which is opened and closed in accordance with axial movement of the spool valve.

The flow control device further includes a bypass valve which is operated in response to the pressure in the fluid discharge passage and arranged as follows: When the pressure in the fluid discharge passage is lowered at a neutral position of the steering wheel (at which the actuator of the power steering system is not operated), the bypass valve causes the second pressure chamber of the flow control valve to be brought into communication with a low fluid pressure side (such as the fluid reservoir side), thereby increasing an opening area of the drain passage under the axial movement of the spool valve thus reducing the amount of hydraulic fluid to be supplied to the actuator of the power steering system.

Thus, according to the above-discussed conventional flow control device, the flow amount of hydraulic fluid in the discharge passage is lowered by moving the spool valve upon establishing fluid communication of the second pressure chamber of the flow control valve with the low fluid pressure side under the action of the bypass valve.

Now, as discussed above, the fluid pressure in the fluid discharge passage is introduced into the second pressure chamber of the flow control valve. In other words, the second pressure chamber is supplied with the fluid pressure prevailing at the downstream side of the restricting orifice, and therefore the hydraulic fluid which has been passed through the restricting orifice is drained to the low fluid pressure side. Consequently, a part of the hydraulic fluid passes through the restricting orifice even when the actuator of the power steering system is not operated. As a result, the pump is required to maintain such a predetermined discharge pressure to allow hydraulic fluid to pass through the restricting orifice. Thus, the pump unavoidably makes an unnecessary work thereby countering energy saving.

SUMMARY OF THE INVENTION

It is an object of the present invention to provide an improved flow control device which can effectively overcome drawbacks encountered in conventional flow control devices or valves, for example, used in power steering systems of automotive vehicles.

Another object of the present invention is to provide an improved flow control device which can effectively suppress an unnecessary energy consumption of a fluid pump when an actuator operated by a fluid pressure is requiring a low fluid pressure under a non-operated condition of the actuator, thereby achieving a sufficient energy saving.

A further object of the present invention is to provide an improved flow control device of a power steering system having an actuator operated under pressure of a hydraulic fluid, by which device the hydraulic fluid can be returned to a low pressure side such as a reservoir, before passing through a restricting orifice leading to the actuator.

A flow control device of the present invention comprises an axially extending hole in which a spool valve is movably disposed having first and second ends. A first pressure chamber is defined in the hole, with the first end of the spool valve. A drain passage is opened to the first pressure chamber and closable with the spool valve. A second pressure chamber is defined in the hole, with the second end of the spool valve. A restricting orifice is communicated with the first pressure chamber. An introduction passage is communicated through the restricting orifice with a discharge passage and opened to the first pressure chamber. The pressure in the discharge passage is introduced to the second pressure chamber. A first spring is disposed in the second pressure chamber to bias the spool valve in a direction to close the drain passage. The second pressure chamber is defined also by a spring holding member movably and coaxially disposed in the second pressure chamber. The spring holding member has a first end face defining the second pressure chamber, and a second end face which is larger in pressure-receiving area than the first end face. The first spring is disposed between the spool valve and the first end face of the spring holding member. Additionally, the spring holding member defines at its second end face a pressure control chamber which is communicated with the second pressure chamber. A second spring is provided to bias the spring holding member in a direction to reduce a volume of the pressure control chamber.

With this arrangement, hydraulic fluid from the hydraulic fluid pump is introduced through the introduction passage into the first pressure chamber. Then, hydraulic fluid in the first pressure chamber is distributed into the discharge passage (through the restricting orifice) and the drain passage only when the drain passage is opened owing to movement of the spool valve under the action of the pressure differential between the upstream and downstream sides of the restricting orifice. A distributed flow portion into the drain passage is an excess amount flow of hydraulic fluid to be returned to the suction side of a hydraulic fluid pump and to a hydraulic fluid reservoir. The other distributed flow portion to the discharge passage is introduced to an actuator (having the pressure surfaces) of a power steering system thereby providing a necessary power-assist force for assisting a driver's steering effort. Here, the first spring is in urging contact with the spring holding member to bias the spring holding member and the spool valve in a direction to separate from each other. The spring holding member is biased in a direction away from the spool valve by the second spring. Accordingly, when the pressure in the pressure control chamber is low relative to a predetermined level (for example, when the actuator of the power steering system is not operated), the spring holding member is biased under the biasing force of the first spring so as to be brought into a position far from the spool valve. As a result, hydraulic fluid supplied to the first pressure chamber is returned to the suction side (not shown) of the hydraulic fluid pump and the hydraulic fluid reservoir through the drain passage before flowing through the restricting orifice, under a non-operated condition of the power steering system in which where no hydraulic fluid is required in the actuator. This causes the discharge pressure of the hydraulic fluid pump to be lowered thereby reducing the amount of work of the pump, thus effectively achieving energy saving.

BRIEF DESCRIPTION OF THE DRAWINGS

In the drawings, same reference numerals designate same parts and elements throughout all the figures, in which.

DETAILED DESCRIPTION OF THE INVENTION

Figure 1:
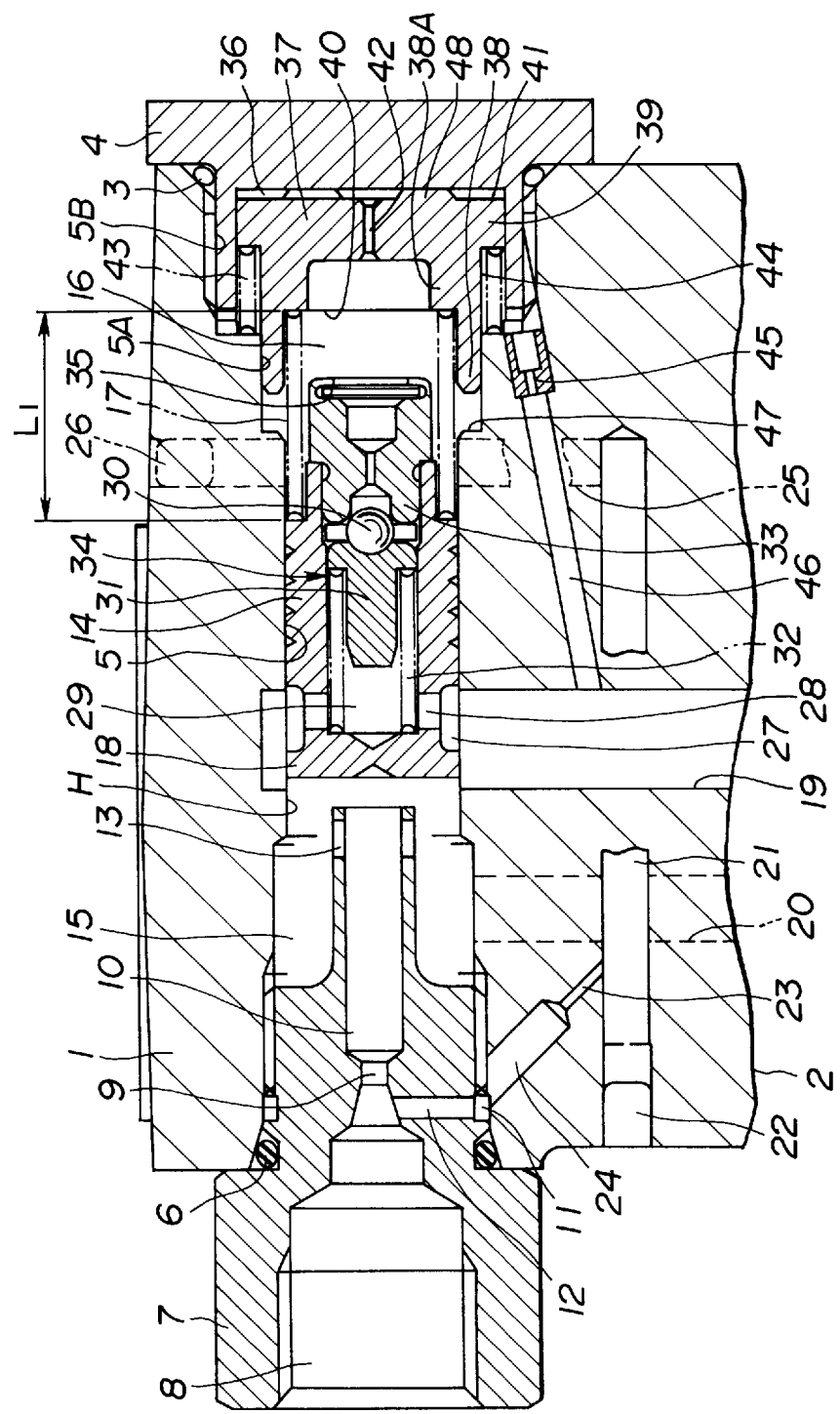
FIG. 1 is a fragmentary vertical sectional view of a first embodiment of a flow control valve in accordance with the present invention, showing an operational mode of the device.
Figure 2:
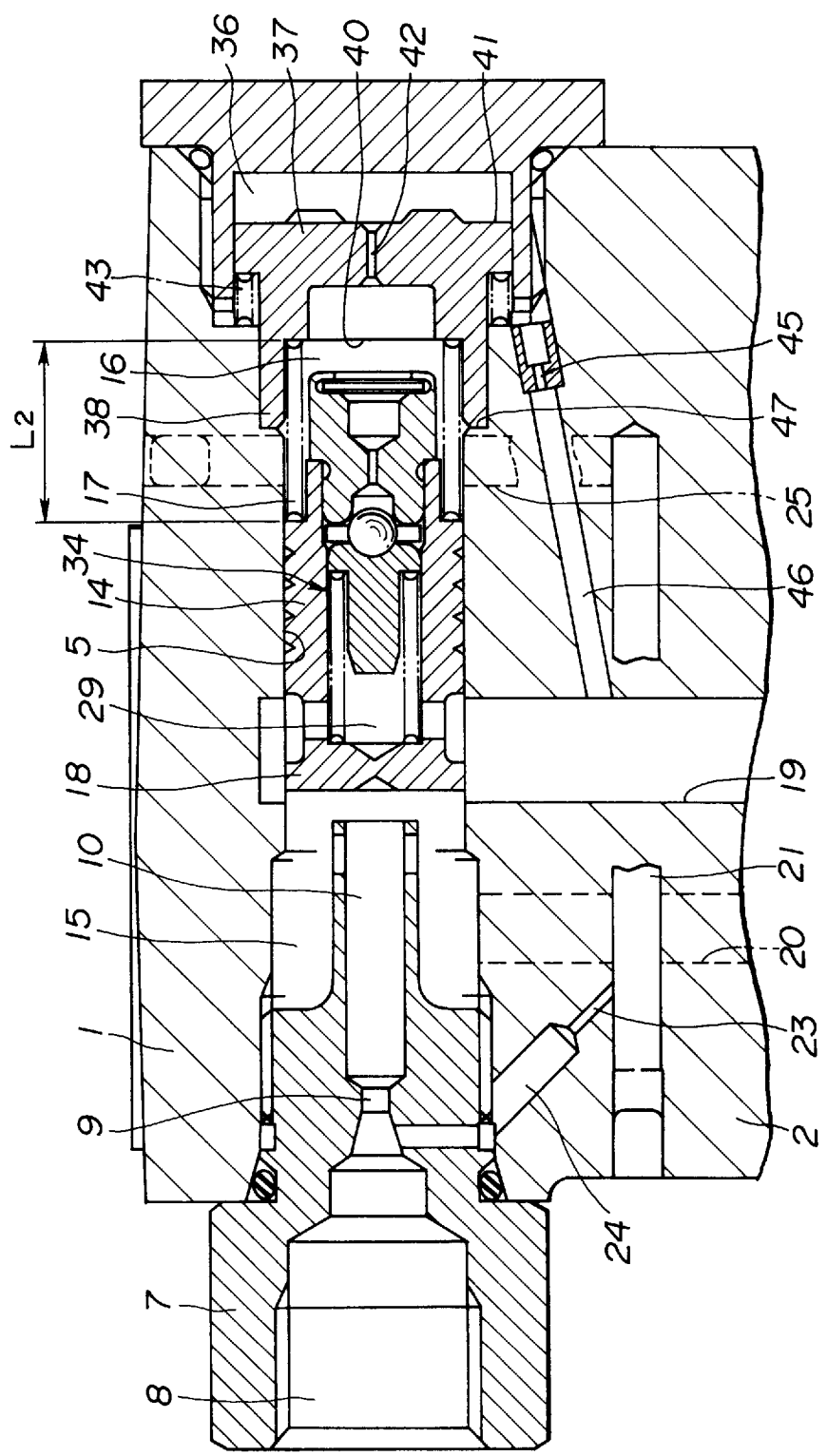
FIG. 2 is a sectional view similar to FIG. 1 but showing another operational mode of the device of FIG. 1.

Referring now to FIGS. 1 and 2, a first embodiment of a flow control device or valve in accordance with the present invention will be illustrated by the reference character F. The flow control valve F of this embodiment is used in a power steering system for an automotive vehicle. The flow control valve F comprises a housing 1 which is formed integral with a pump body 2 in which a pump mechanism (not shown) of a hydraulic fluid pump is disposed. The housing 1 is formed with an axially extending hole or bore H which is circular in cross-section and opens at the opposite side wall surfaces of the housing 5. One end of the hole H is sealingly closed with a generally cap-shaped plug 4, in which a seal ring 3 is disposed between the plug 4 and the housing 5. The other end of the hole H is sealingly closed with a generally cylindrical connector 7 which is screwed in the hole 5 to be fixed in position and sealed with a seal ring 6 disposed between the plug 4 and the housing 5.

The connector 7 defines thereinside an axial discharge or pressure passage 8 which is to be communicated with a power steering control valve (not shown) through which hydraulic fluid from the flow control valve F is supplied to an actuator (not shown) having pressure surfaces that are used to assist steering effort. The connector 7 is further formed with a restricting orifice 9 which is communicated and coaxial with the discharge passage 8. An axially extending passage 10 is defined inside a cylindrical section (no numeral) of the connector 7, and communicated and coaxial with the restricting orifice 9. The passage 10 is located at an axially opposite side of the restricting orifice 9 with respect to the discharge passage 8. An annular peripheral groove 11 is formed at the outer peripheral surface of the connector 7. A radially extending through-hole 12 is formed in the connector 7, and has a first end opened to the bottom of the peripheral groove 11 and a second end opened to the discharge passage 8 at a location near the restricting orifice 9. The peripheral groove 11 is sealingly covered with the inner peripheral surface of the housing 1 so as to define an annular passage. The cylindrical section (defining the passage 10) of the connector 7 is formed at its tip end section with two opposite radial through-holes 13 which are in communication with the passage 10.

The hole H of the housing 1 includes a spool valve accommodating hole section 5 which is located at the central part of the hole H. A spool valve 14 is slidably inserted in the spool valve accommodating hole section 5 and defines a first pressure chamber 15 and a second pressure chamber 16 in the hole H. The first pressure chamber 15 is formed between the connector 7 and the spool valve 14, while the second pressure chamber 16 is formed in a part of a space between the plug 4 and the spool valve 14. The spool valve 14 is always biased toward the first pressure chamber 15 under a biasing force of a control coil spring 17 disposed in the second pressure chamber 16. The spool valve 14 is arranged such that its land section 18 normally closes a drain or return passage 19 which is in communication with the suction side of the hydraulic pump and a hydraulic fluid reservoir (not shown). An introduction passage 20 connected to the discharge side of the hydraulic fluid pump is opened to the first pressure chamber 15 so that hydraulic fluid is introduced into the first pressure chamber 15.

A straight passage 21 is formed in the housing 1 and extends generally parallel with the hole 5. The passage 21 has its bottom closed and is closed at its open end section with a plug 22. One end section of the passage 21 is in communication with the peripheral groove 11 of the connector 7 through a pressure-responsive orifice 23 and an inclined hole 24, while the other end section of the passage 21 is in communication with the second pressure chamber 16 through a passage 25. The passage 25 is formed in the housing 1 and extends to diametrically pass through the second pressure chamber 16. The passage 25 has an end section connected to the passage 21 and the other end section closed with a plug 26.

The spool valve 14 is formed with annular peripheral groove 27 formed at the peripheral surface the spool valve 14. An axial hole 29 is formed in the spool valve 14 to have a closed bottom located near one end of the spool valve 14. The axial hole 29 is opened at the other end of the spool valve 14. Two opposite through-holes 28 are formed radially in the spool valve 14 in such a manner as to connect the peripheral groove 27 with the axial hole 29.

A plug 33 having an axial through-hole (no numeral) is tightly fitted in the open end section of the axial hole 29. A pressing member 32 is axially movably disposed in the axial hole 29 and located between the plug 33 and the closed bottom of the axial hole 29. A spherical valve member 30 is movably disposed between the plug 33 and the pressing member 31. The pressing member 31 is biased toward the plug 33 under a biasing force of a check spring 32 so that the spherical valve member 30 is biased to be normally seated on a valve seat (no numeral) formed at the central portion of the tip end of the plug 33. The valve seat is communicated through the axial through-hole with the second pressure chamber 16. The pressing member 31 is also formed at one end face with a depression serving as a valve seat for the spherical valve member 30. When the spherical valve member 30 separates from the valve seat of the plug 33, hydraulic fluid in the second pressure chamber 16 flows to the side of the pressing member 31. Thus, the spherical valve member 30, the pressing member 31, the check spring 32 and the like constitute a relief valve 34. This relief valve, 34 is adapted to release an excessive pressure in the discharge passage 8 which pressure is introduced through the pressure-sensitive orifice 23 into the second pressure chamber 16. The plug 33 is provided with a filter 35 located at the side of the second pressure chamber 16 to filter hydraulic fluid to be introduced from the second pressure chamber 16 into the axial through-hole of the plug 33.

The hole H of the housing includes a large diameter hole section 5A which is continuous to the spool valve accommodating hole section 5 and has a diameter larger than that of the spool valve accommodating section 5. Additionally, a further large diameter hole section 5B is formed as a part of the hole H and continuous to the large diameter hole section 5A. The hole section 5B has a diameter larger than that of the hole section 5A. A generally cap-shaped spring holding member 37 is movably disposed in the hole section 5A and located between the spool valve 14 and the plug 4. The second pressure chamber 16 is defined between the spring holding member 37 and the spool valve 14. The spring holding member 37 has a large diameter flange section 39 which is slidably fitted inside a cylindrical section (no numeral) of the plug 4. The cylindrical section of the plug 4 is screwed in the hole section 5B of the hole H of the housing 1. The spring holding member 37 has a cylindrical section 38 which is slidably fitted inside the hole section 5A of the hole H and has an outer peripheral diameter smaller than that of the flange section 39. The annular tip end of the cylindrical section 38 is contactable with an annular wall 47 defining the hole section 5A. A generally cylindrical spring holding section 38A is formed integral with cylindrical section 38 and located radially inward of the cylindrical section 38. The control spring 17 is held between the spool valve 14 and an annular end face (no numeral) of the spring holding section 38A so as to bias the spool valve 14 and the spring holding member 37 in a direction that they separate from each other. The spring holding member 37 has an end face 40 which defines the second pressure chamber 16 and has a cross-sectional area corresponding to that of the second pressure chamber 16. The spring holding member 37 is provided at the other end face 41 with projections which project toward and are to be brought into contact with the plug 4. The end face 41 is located opposite to the end face 40 to define the pressure control chamber 36.

A spring accommodating chamber 44 is formed to be confined by the plug 4, the spring holding member 37 and the inner wall of the housing 1. A coil spring 43 is disposed in the spring accommodating chamber 44 and located between an annular side wall (no numeral) of the hole section 5B of the housing 1 and an annular side face of the flange section 39 of the spring holding member 37 to bias the spring holding member 37 in a direction away from the spool valve 14. The spring accommodating chamber 44 is in communication with the drain passage 19 through a pressure-responsive orifice 45 and an inclined hole 46. A pressure control chamber 36 is defined between the plug 4 and the spring holding member 37 and in communication with the second pressure chamber 16 through an axial passage formed through the spring holding member 37 so that pressure within the second pressure chamber 16 is introduced into the pressure control chamber 36.

Figure 3:
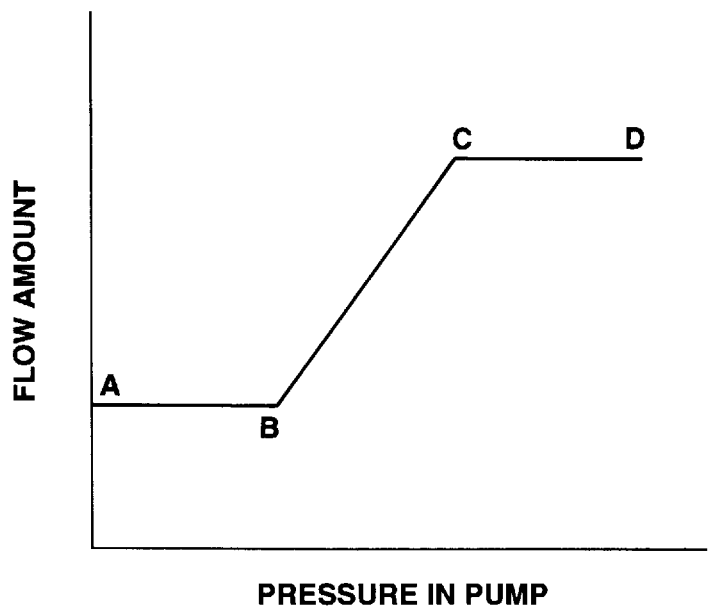
FIG. 3 is a graph of a flow amount characteristics obtained by the device of FIG. 1.

A manner of operation of the flow control valve F of this embodiment will be discussed hereinafter also with reference to FIG. 3.

Hydraulic fluid from the hydraulic fluid pump is introduced through the introduction passage 20 into the first pressure chamber 15. Then, hydraulic fluid in the first pressure chamber 15 is distributed into the discharge passage 8 (through the restricting orifice 9) and the drain passage 19 only when the drain passage 19 is opened owing to movement of the spool valve 14 under the action of the pressure differential between the opposite sides of the restricting orifice 9. A distributed flow portion into the drain passage 19 is an excessive amount flow of hydraulic fluid to be returned to the suction side (not shown) of the hydraulic fluid pump and to the hydraulic fluid reservoir. The other distributed flow portion to the discharge passage 8 is introduced through the power steering control valve to the actuator (having the pressure surfaces) of the power steering system thereby providing a necessary power-assist force for assisting a driver's steering effort.

In a normal condition, the spool valve 14 is biased to the side of the connector 7 under the biasing force of the control spring 17, in which the land section (or cylindrical section) of the spool valve 14 is closing the drain passage 19. Accordingly, the whole amount of hydraulic fluid introduced into the first pressure chamber 15 is supplied through the restricting orifice 9 into the actuator of the power steering system. When the rotational speed of the hydraulic fluid pump increases to raise a discharge amount of hydraulic fluid from the pump, the amount of hydraulic fluid to be introduced into the first pressure chamber 15 increases under a flow restricting action of the restricting orifice 9. As a result, the spool valve 14 moves rightward taking a position shown in FIG. 1 in accordance with a pressure differential between the opposite (upstream and downstream) sides of the restricting orifice 9, while a part of hydraulic fluid in the first pressure chamber 15 is introduced to the discharge passage 8. The thus moved spool valve 14 opens the drain passage 19, and therefore an excess amount of hydraulic fluid is returned through the drain passage 19 to the hydraulic fluid reservoir (not shown).

Here, in this embodiment, the control spring 17 is in urging contact with the spring holding member 37. The spring holding member 37 has the end face 41 defining the pressure control chamber 36 and the opposite end face 40 defining the second pressure chamber 16, in which the former end face 41 defining the pressure control chamber 36 is larger in axial pressure receiving area than the latter end face 40 defining the second pressure chamber 16. In other words, the projected area (on a plane perpendicular to the axis of the hole H) of the former end face 41 defining the pressure control chamber 36 is larger than that of the latter end face 40 defining the second pressure chamber 16. In this connection, the pressure control chamber 36 is larger in cross-sectional area (perpendicular to the axis of the hole H) than the second pressure chamber 16. The spring holding member 37 is biased in a direction away from the spool valve 14 by the spring 43.

Accordingly, when the pressure in the pressure control chamber 36 is low relative to a predetermined level, the spring holding member 37 is biased under the biasing force of the spring 43 so as to be brought into a position far from the spool valve 14 as shown in FIG. 1. It will be understood that the pressure in the pressure control chamber 36 is equal to that in the second pressure chamber 16 into which the pressure in the discharge passage 8 is introduced. On the contrary, when the pressure in the pressure control chamber 36 is high relative to the predetermined level, the spring holding member 37 is moved toward the spool valve 14 against the biasing force of the spring 43 and comes into a position at which the tip end of the cylindrical section 38 is in contact with an annular wall (no numeral) defining the large diameter hole section 5A as shown in FIG. 2. Therefore, the spool valve 14 is movable in accordance with a balance between the sum of the biasing force of the control spring 17 (having an installation length of L1) and the pressure in the second pressure chamber 16 and the pressure in the first pressure chamber 15, in which the spring holding member 37 is located in a position which is in accordance with the pressure in the pressure control chamber 36. Thus, flow control in this flow control valve F is accomplished under the above-mentioned balance.

More specifically, when the pressure in the discharge passage 8 is low, the pressure in the pressure control chamber 36 is low so that the spring holding member 37 is located in the position at which the pressure control chamber 36 has its minimum volume. As a result, the biasing force (set load) of the control spring 17 is lowered. Accordingly, the spool valve 14 is controlled by this control spring 17 having the thus lowered biasing force, and therefore the flow amount of hydraulic fluid passing through the restricting orifice becomes one indicated by a segment A-B in FIG. 3 which shows a variation of flow amount of hydraulic fluid flowing through the discharge passage 8 in terms pressure in the hydraulic fluid pump.

When the pressure in the pressure control chamber 36 rises upon operating the actuator of the power steering system or rotating a steering wheel of the vehicle relative to its neutral position, the spring holding member 37 moves toward the spool valve 14 while compressing the control spring 17 so that the set load or biasing force of the spring 17 is gradually increased. Accordingly, the spool valve 14 is controlled in accordance with the thus increased biasing force of the control spring 17 and the pressure differential between the opposite sides of the restricting orifice 9. As a result, the flow amount of the hydraulic fluid passing through the restricting orifice 9 becomes one indicated by a segment B-C in FIG. 3.

When the pressure in the pressure control chamber 36 has reaches a predetermined high level, the spring holding member 37 is moved to the position to maximize the volume of the pressure control chamber 36, thereby rendering the set load or biasing force of the control spring the maximum. At this state, the spool valve 14 is controllably moved in accordance with the set load of the control spring 14 and the pressure differential between the opposite sides of the restricting orifice 9. As a result, the flow amount of hydraulic fluid passing through the restricting orifice 9 becomes one indicated by a segment C-D in FIG. 3.

When the actuator of the power steering system is not operated (or the power steering control valve or a steering wheel is in neutral), the hydraulic fluid pressure within the discharge passage 8 is lowered, the spool valve 14 is moved toward the plug 4 against the biasing force of the control spring 17 within the second pressure chamber 16 to increase the opening area of the drain passage 19 in order to maintain the pressure differential between the opposite sides of the restricting orifice 9 at a constant level. This causes a large part of the hydraulic fluid introduced into the first pressure chamber 15 to flow into the drain passage 19 so as to lower the pressure within the hydraulic fluid pump, thereby reducing the amount of work of the hydraulic fluid pump.

In concurrence with the above, when the pressure in the discharge passage 8 is lowered under the non-operated condition of the actuator, the pressure in the pressure control chamber 36 to be supplied with the thus lowered pressure is lowered. This moves the spring holding member 37 toward the plug 4, so that the holding member 37 stops at a position at which the projections 48 thereof are brought into contact with the plug 4. Since the spring holding member 37 moves in the direction away from the spool valve 14, the set length of the spring 17 disposed in compression state between the spring holding member 37 and the spool valve 14 becomes L1 as shown in FIG. 1. Thus, the set length (L1) of the spring 17 under the low pressure condition of the pressure control chamber 36 as shown in FIG. 1 increases as compared with that (L2) under the high pressure condition of the pressure control chamber 36 as shown in FIG. 2.

As discussed above, the spool valve 14 is movable in accordance with the pressure differential between the opposite sides of the restricting orifice 9 or in accordance with the balance between the pressure in the first pressure chamber 15 and the sum of the pressure in the second pressure chamber 16 and the biasing force of the control spring 17. Accordingly, the biasing force of the control spring 17 is reduced by an amount corresponding to a movement distance of the spring holding member 37 toward the plug 4, so that the spool valve 14 is further moved in a direction to reduce the volume of the second pressure chamber 16 thereby increasing the opening area of the drain passage 19.

As a result, hydraulic fluid supplied to the first pressure chamber 15 is returned to the suction side (not shown) of the hydraulic fluid pump and the hydraulic fluid reservoir through the drain passage 19 before flowing through the restricting orifice, under a non-operated condition of the power steering system in which where no hydraulic fluid is required in the actuator. This causes the discharge pressure of the hydraulic fluid pump to be lowered thereby reducing the amount of work of the pump, thus effectively achieving energy saving.

Additionally, the pressure control chamber 36 is formed such that the axis thereof is aligned with the axis of the spool valve accommodating hole section 5, and therefore the flow control valve F can be prevented from being largely increased in length.

While the passage 42 for introducing the second pressure chamber 16 to the pressure control chamber 36 has been shown and described as being formed in the spring holding member 37, it will be appreciated that the passage 42 may be replaced with a passage (not shown) formed in the housing 1 in a manner to connect the second pressure chamber 16 to the pressure control chamber 36.

Figure 4:
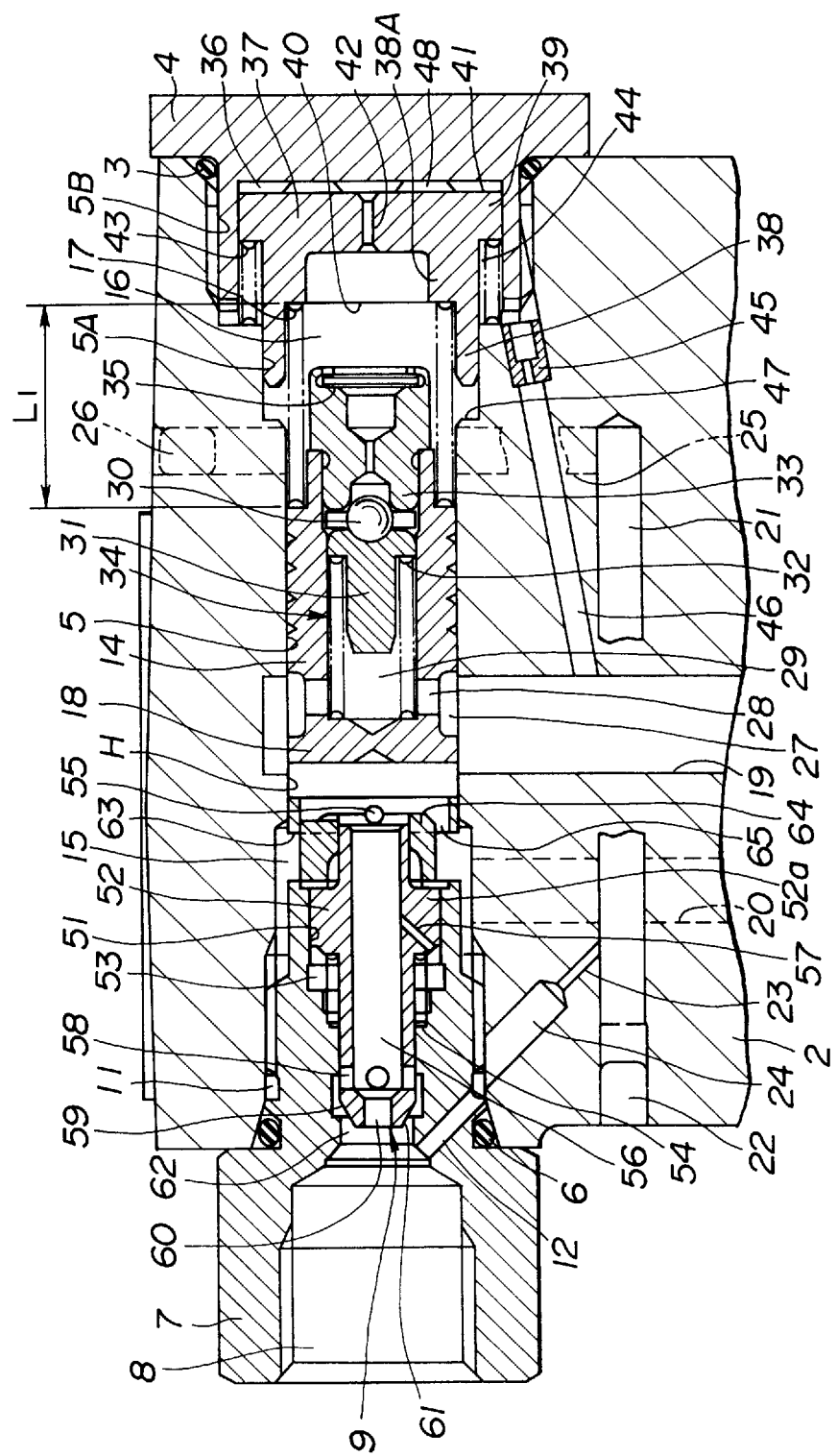
FIG. 4 is a fragmentary vertical sectional view of a second embodiment of the flow control valve in accordance with the present invention, showing an operational mode of the device.
Figure 5:
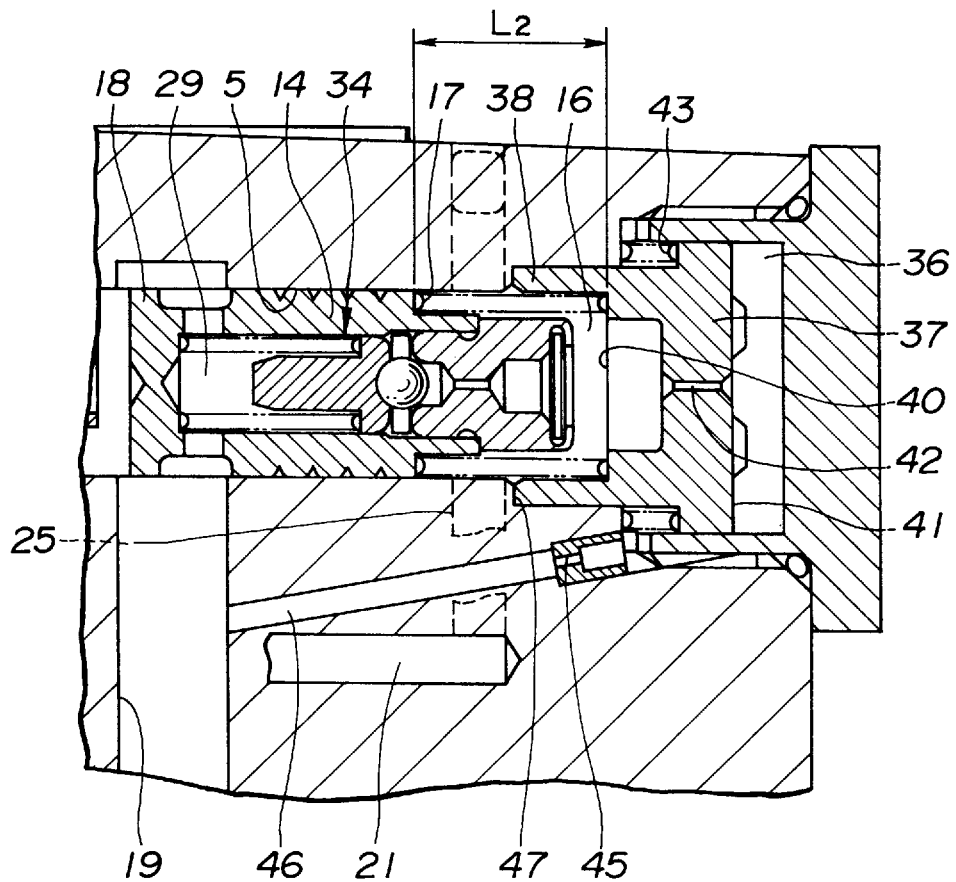
FIG. 5 is a fragmentary vertical sectional view showing an essential part of the device of FIG. 4, showing another operational mode of the device of FIG. 4.

FIGS. 4 and 5 illustrate a second embodiment of the flow control device F in accordance with the present invention, similar to the first embodiment except for the structure of the connector 7. In this embodiment, the connector 7 is formed with an axial extending hole 51 which is coaxial with the connector 7 and has a small diameter section (no numeral) continuous to the discharge passage 8, and a large diameter section (no numeral) continuous to the small diameter section. A generally cylindrical sub-spool valve 52 is slidably movably disposed in the hole 51 and includes a generally cylindrical body section (no numeral) formed with an annular flange section 52a which extends radially outwardly from the body section, in which the annular flange section 52a is slidably movably disposed in the large diameter section of the hole 51. An intermediate pressure chamber 53 is formed between the flange section 52a of the sub-spool valve 52 and an inner wall surface (no numeral) defining the large diameter section of the hole 51. A spring 54 is disposed within the intermediate pressure chamber 53 to bias the sub-spool valve 52 toward the spool valve 14. A pin 55 is planted in the connector 7 to prevent the sub-spool valve 52 from getting out of the connector 7.

The inside hollow of the sub-spool valve 52 serves as a passage 56 which is in communication with the first pressure chamber 15. The passage 56 is in communication with the intermediate pressure chamber 53 through an inclined hole 57 formed through the flange section 52a. The sub-spool valve 52 is formed at its one end section with oppositely located through-holes 58, 58 which extend radially outwardly. The passage 56 is communicated through the through-holes 58 with an annular peripheral groove 59 which is formed an inner peripheral surface defining the small diameter section of the hole 51. An axial main orifice 60 is formed in the sub-spool valve 52 and located at the tip end portion of the sub-spool valve 52. The passage 56 of the sub-spool valve 52 is in communication with the discharge passage 8 through the main orifice. Additionally, the tip end portion of the sub-spool valve 52 is formed at its outer peripheral section with a tapered surface 61 which is tapered toward the discharge passage 8. The tapered surface 61 is locatable radially inside and contactable with an annular corner portion (no numeral) defining the peripheral groove 59, so that the tapered surface 61 and the annular corner portion constitute a sub-orifice 62. The sub-orifice 62 is formed coaxial with the main orifice 60 to constitute the restricting orifice 9 for controllably restricting the flow amount of hydraulic fluid to be supplied into the discharge passage 8.

The hole 51 further includes a further large diameter section (no numeral) which is continuous to the abovementioned large diameter section of the hole 51 and is formed with a cutout 63 which is in communication with the introduction passage 20. The pressure of hydraulic fluid in the introduction passage 20 is exerted through the cutout 63 onto the flange section 52a of the sub-spool valve 52. A guide member 64 is fixedly disposed inside the further larger diameter section of the hole 51 to slidably support the other end section of the sub-spool valve 52. An orifice passage 65 is formed between the outer peripheral surface of the guide member 64 and the inner peripheral surface of the connector 7 at a portion defining the further large diameter section of the hole 51.

Figure 6:
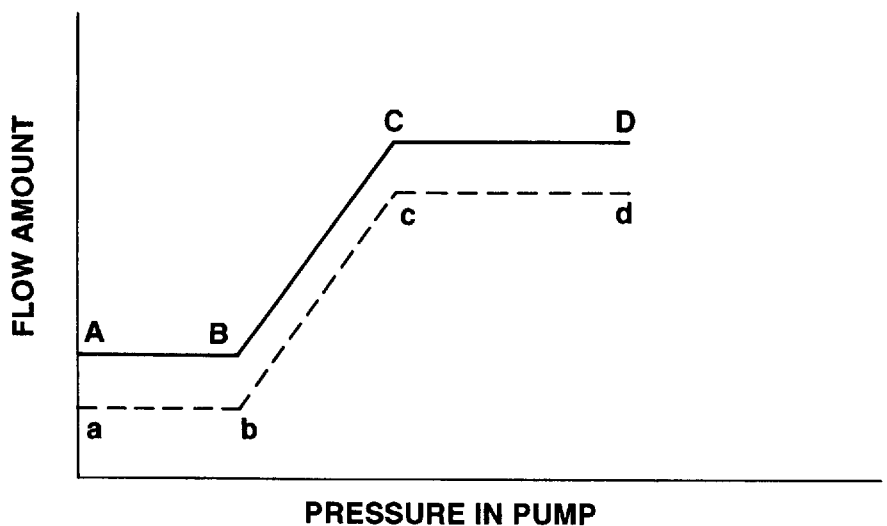
FIG. 6 is a graph of a flow amount characteristics in terms of pressure within a hydraulic fluid pump, obtained by the device of FIG. 4.

The manner of operation of this embodiment is similar in principle to that of the first embodiment, and therefore the flow amount characteristics of hydraulic fluid passing through the restricting office 9 is also the same as that (FIG. 3) of the first embodiment, as shown in FIG. 6. In FIG. 6, a dotted line represents the same flow amount characteristics under a condition that rotational speed of the hydraulic fluid pump is higher than a predetermined level, in which a segment a-b corresponds to the segment A-B, a segment b-c to the segment B-C, and a segment c-d to the segment C-D.

Figure 7:
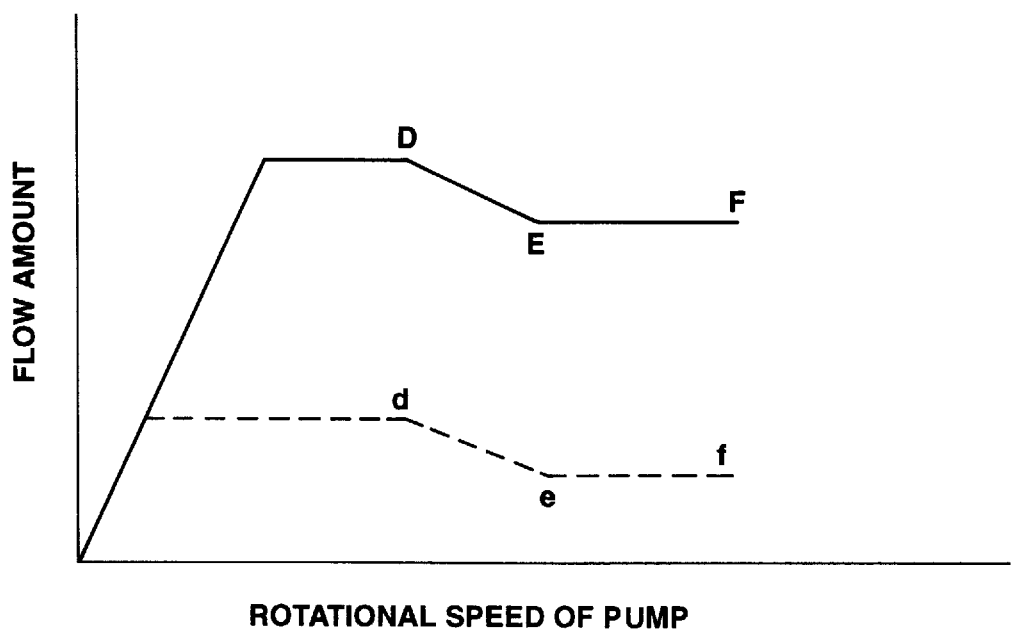
FIG. 7 is a graph of a flow amount characteristics in terms of a rotational speed of the hydraulic fluid pump, obtained by the device of FIG. 4.

With this embodiment, when the hydraulic fluid pump increases in rotational speed to raise the power output thereof, the amount of hydraulic fluid to be introduced into the introduction passage 20 increases so that a pressure differential is developed at the upstream and downstream sides of the orifice passage 65. The pressure of hydraulic fluid prevailing at the upstream side of the orifice passage 65 is exerted on the flange section 52a of the sub-spool valve 52, so that the sub-spool valve 52 is moved leftward in FIG. 4 thereby to narrow the sub-orifice 62 formed between the tapered surface 61 of the sub-spool valve 52 and the annular corner portion defining the peripheral groove 59. This restricts and reduces a flow of hydraulic fluid through the passage 56, the through-holes 58 and the sub-orifice 62. As a result, the flow amount of hydraulic fluid is largely reduced as indicated by a segment D-E of FIG. 7, thereby accomplishing a flow down control. FIG. 7 represents a variation in flow amount of hydraulic fluid passing through the restricting orifice 9 in terms of rotational speed of the hydraulic pump.

When the power output of the hydraulic fluid pump is further increased, the sub-spool valve 52 is further moved leftward in FIG. 4 thereby closing the sub-orifice 62 formed coaxial with the main orifice 60. This reduces the substantial opening area of the restricting orifice 9, and therefore the flow amount of hydraulic fluid passing through the restricting orifice 9 becomes one indicated by a segment E-F in FIG. 7.

When the pressures prevailing at the upstream and downstream sides of the orifice passage 65 become generally equal with each other, the sub-spool valve 52 moves rightward in FIG. 4 under the biasing force of the spring 54 disposed in the intermediate pressure chamber 53. This rightward (backward) movement of the sub-spool valve 52 is stopped when its tip end (at the side of the first pressure chamber 15) is brought into contact with the pin 55.

Thus, the flow control device or valve of this embodiment can provide a flow amount characteristics as shown in FIGS. 6 and 7 under a series of flow control operations. As a result, during a low vehicle speed cruising or stopping of the vehicle, the highest flow amount of hydraulic fluid can be supplied to the actuator of the power steering system thereby obtaining a sufficient assisting force for assisting the driver's steering effort. During a high vehicle speed cruising in which the ground-contacting resistance of the road wheels is small, the flow amount of hydraulic fluid to be supplied to the actuator is reduced thereby to decrease the steering effort assisting force, thus obtaining a driving stability of the vehicle.

Figure 8:
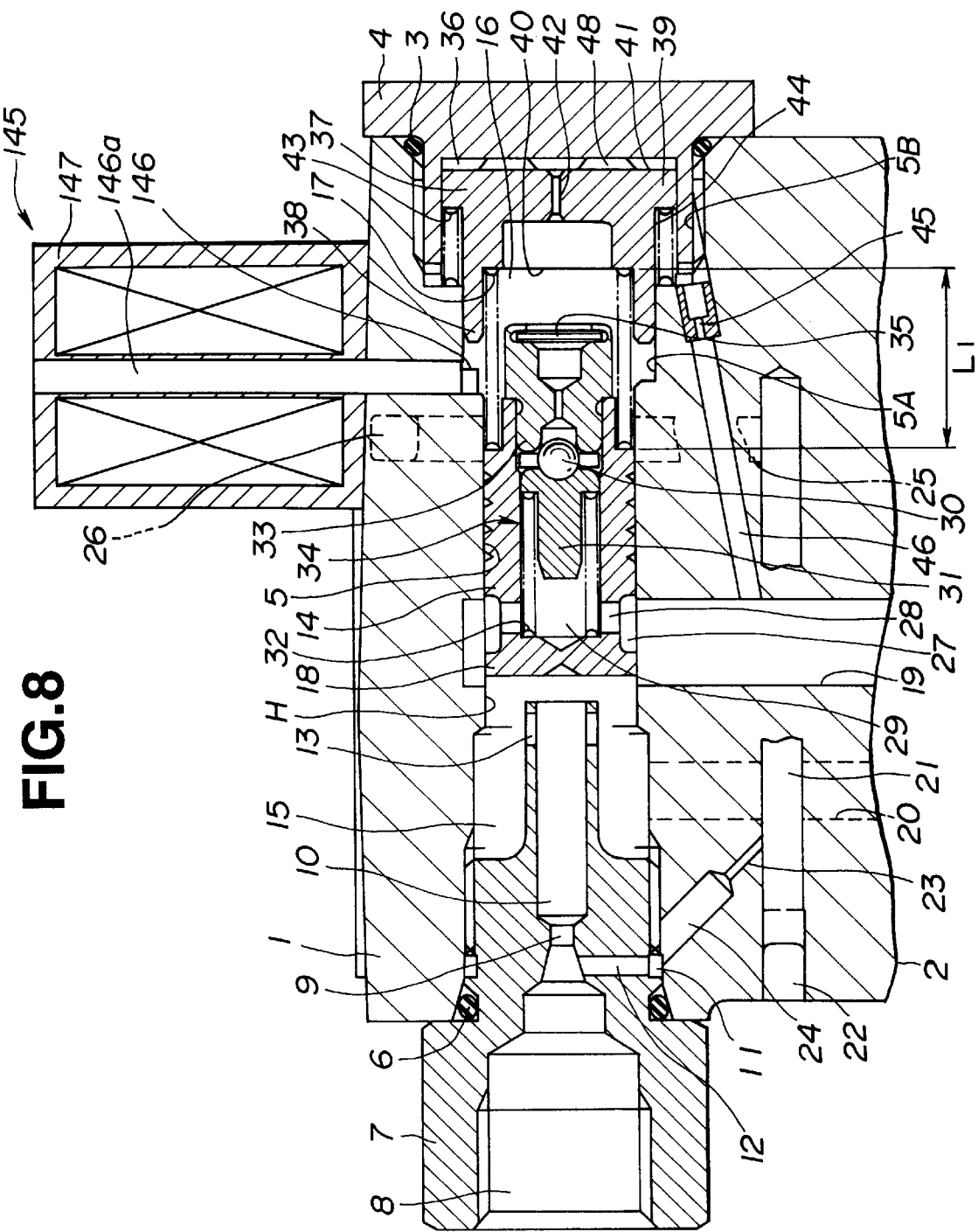
FIG. 8 is a fragmentary vertical sectional view of a third embodiment of the flow control device according to the present invention, showing an operational mode of the device.
Figure 9:
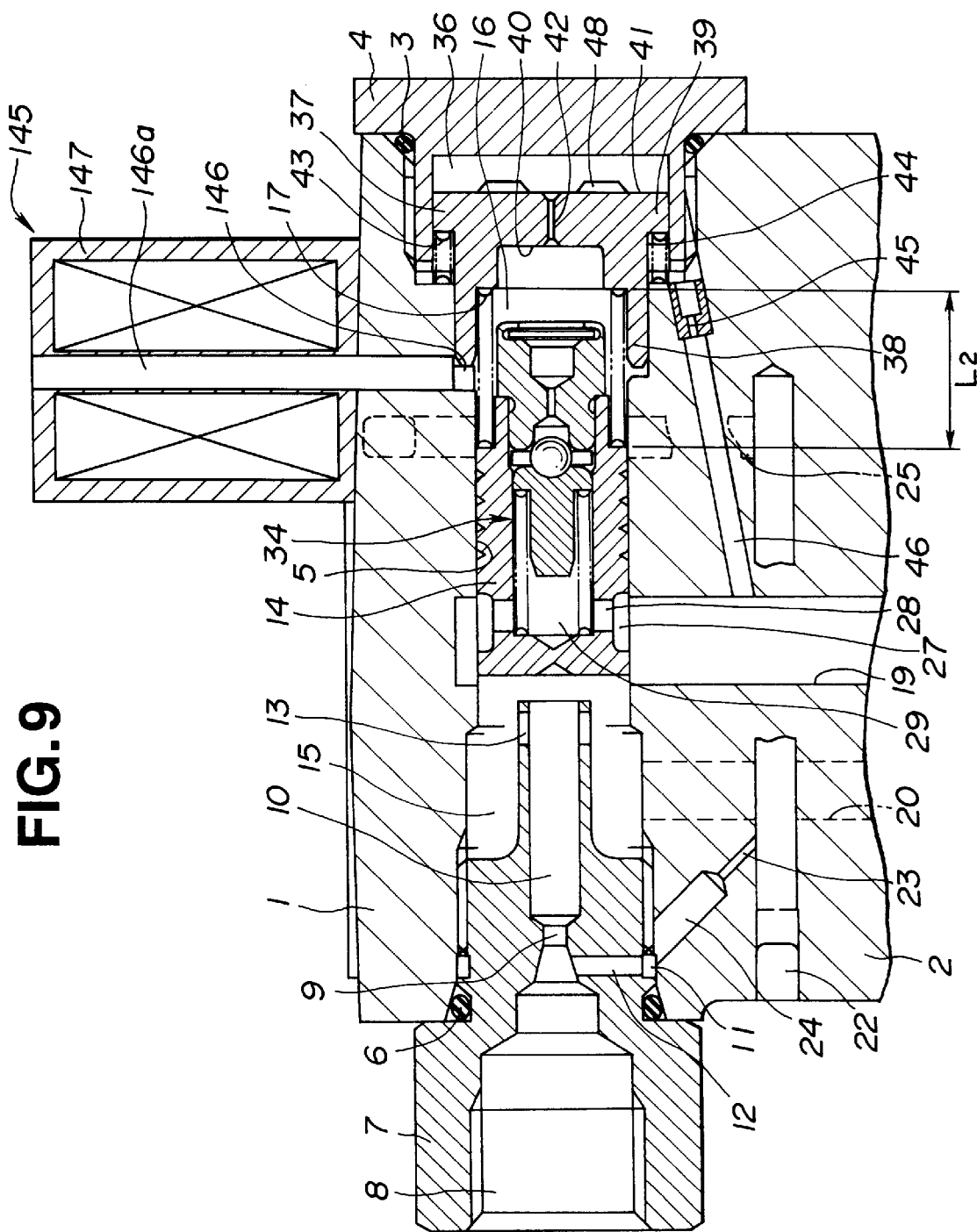
FIG. 9 is a sectional view similar to FIG. 8 but showing another operational mode of the device of FIG. 8.
Figure 10:
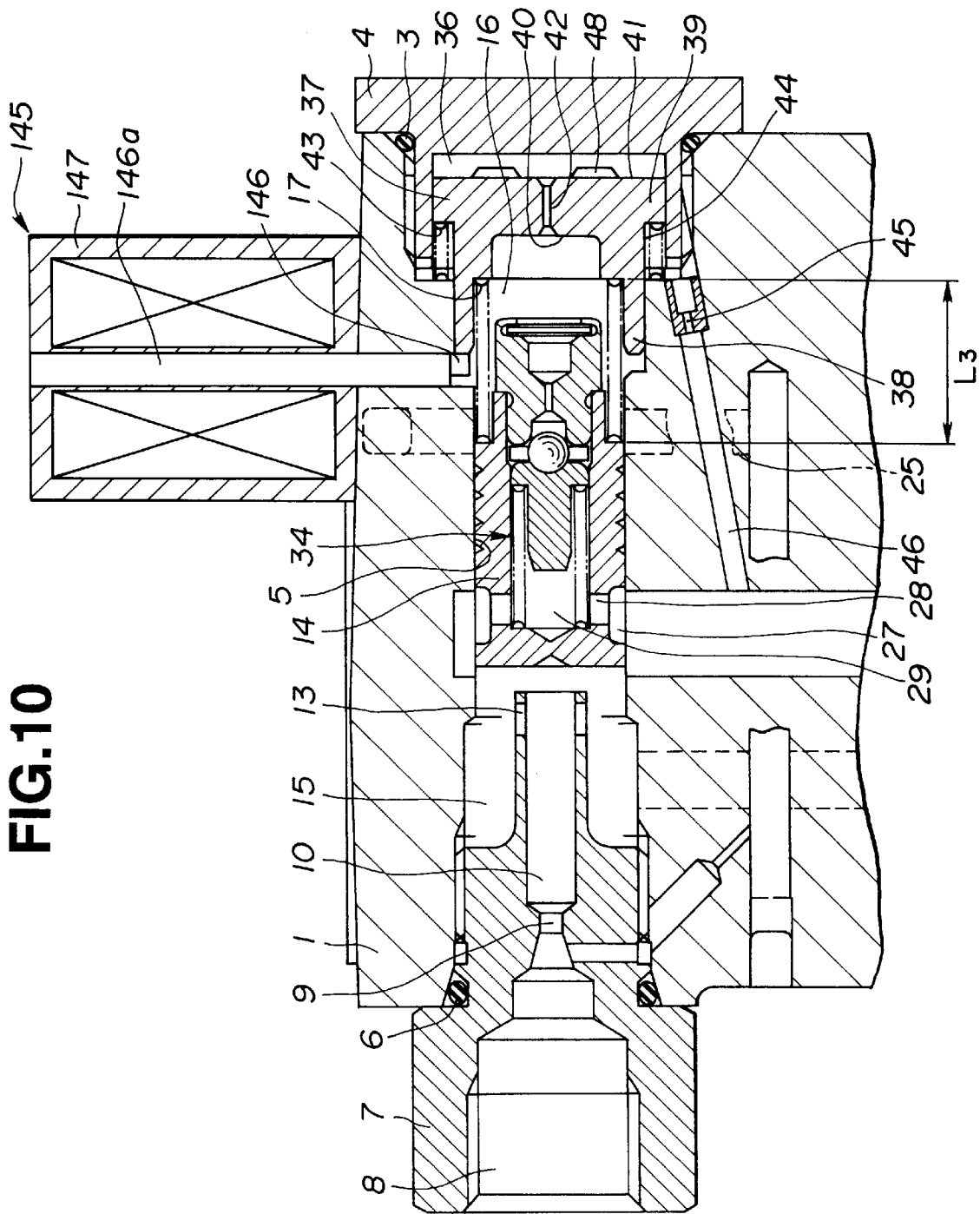
FIG. 10 is a sectional view similar to FIG. 8 but showing a further operational mode of the device of FIG. 8.

FIGS. 8 to 10 illustrate a third embodiment of the flow control device F according to the present invention, which is similar to the first embodiment flow control device with the exception that a spring holding member control device 145 is provided to control a movement of the spring holding member 39 toward the spool valve 14 or in a direction to reduce the volume of the second pressure chamber 16.

Figure 12:
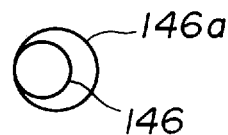
FIG. 12 is a plan view showing an eccentric cam forming part of the device of FIG. 8.

In this embodiment, the spring holding member control device 145 includes an eccentric cam 146 which is fixed to an tip end of a rotatable shaft 146a which is rotationally driven by a step motor 147. The cylindrical section 38 of the spring holding member 37 is to be brought into contact with the eccentric cam 146. The eccentric cam 146 has a circular cross-section in plan and formed eccentric relative to the rotatable shaft 146a having a circular cross-section in plan, as shown in FIG. 12. The step motor 147 is arranged to control the rotational angle of the rotatable shaft 146a in accordance with a vehicle (cruising) speed. The step motor 147 is supplied with a vehicle speed signal representative of the vehicle speed, from a vehicle speed sensor (not shown).

The flow control device of this embodiment operates similar in principle to the first embodiment flow control device, so that the flow amount characteristics of hydraulic fluid passing through the restricting office 9 is also the same as that (FIG. 3) of the first embodiment, as indicated by the segments A-B, B-C and C-D in FIG. 6.

In this embodiment, when the pressure in the pressure control chamber 36 is high relative to the predetermined level, the spring holding member 37 is moved toward the spool valve 14 against the biasing force of the spring 43 and comes into a position at which at which the tip end of the cylindrical section 38 is in contact with the eccentric cam 146 as shown in FIG. 9 in which the set length (L1 in FIG. 8) of the control spring 17 is decreased to that (L2 in FIG. 9). Therefore, the spool valve 14 is movable in accordance with a balance between the sum of the biasing force of the control spring 17 (having an installation length of L2) and the pressure in the second pressure chamber 16 and the pressure in the first pressure chamber 15, in which the spring holding member 37 is located in a position determined in accordance with the pressure in the pressure control chamber 36. Thus, flow control in this flow control valve F is accomplished under the above-mentioned balance.

Figure 11:
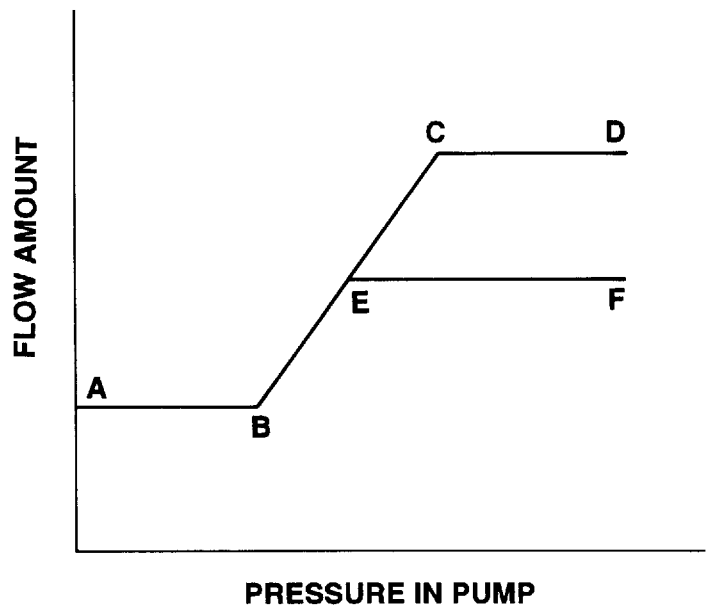
FIG. 11 is a graph of a flow amount characteristics obtained by the device of FIG. 8.

In this case, the cylindrical section 38 of the spring holding member 37 is stopped upon coming into contact with the eccentric cam 146 as shown in FIG. 9. In other words, a movement of the spring holding member 37 toward the spool valve 14 is controlled by the spring holding member control device 145. More specifically, when the vehicle (cruising) speed is high relative to a predetermined level, the eccentric cam 146 is rotated to a position shown in FIG. 10, so that the spring holding member 37 is held in a position farther from the spool valve 14 as compared with that in FIG. 9. Thus, the spring holding member 37 is moved in accordance with a balance between the sum of the biasing force of the control spring 17 (having the set length L3) and the pressure in the second pressure chamber 16 and the pressure in the first pressure chamber 15, so as to accomplish a flow control of the hydraulic fluid to be supplied to the actuator of the power steering system through the restricting orifice 9. Consequently, the amount of hydraulic fluid to be introduced into the discharge passage 8 is decreased as compared with that in case of FIG. 9 in which the set length of the control spring 17 is L2, thereby lowering the flow amount of hydraulic fluid to the actuator at a level according to the vehicle speed. In this connection, the flow amount characteristics of hydraulic fluid passing through the restricting orifice 9 becomes one indicated by the segment C-D in FIG. 11 when the spring holding member 37 is located at its leftmost position as shown in FIG. 9; however, the same flow amount characteristics is changed to one indicated by a segment E-F in FIG. 11 when the spring holding member 37 is located at a slightly rightward position (in FIG. 10) relative to the position in FIG. 9.

Thus, during a low vehicle speed cruising or stopping of the vehicle, the highest flow amount of hydraulic fluid can be provided to the actuator of the power steering system thereby obtaining a sufficient assisting force for assisting the driver's steering effort. During a high vehicle speed cruising in which the ground-contacting resistance of the road wheels is small, the flow amount of hydraulic fluid to be supplied to the actuator is reduced thereby to decrease the steering effort assisting force, thus obtaining a driving stability of the vehicle. The maximum flow amount of hydraulic fluid to be supplied to the actuator is changeably controlled at any values by the spring holding member control device 145, thus obtaining an optimum flow amount for the actuator in accordance with the vehicle speed.

While only the step motor 147 has been shown and described as means for driving the eccentric cam 146 in this embodiment, it will be understood that an electromagnetic solenoid (not shown) may be used in place of the step motor 147.

FIGS. 13 to 17 illustrate a fourth embodiment of the flow control device F according to the present invention, similar to the first embodiment flow control device except for the structure of the spring 43. In this embodiment, the annular flange section 39 is fixed on the peripheral surface of a body section 37A of the spring holding member 37. The spring accommodating chamber 44 is defined between the annular flange section 39 and the annular side wall 1a defining the hole section 5B forming part of the hole H.

The spring 43 includes a large diameter coil spring 43a and a small diameter coil spring 43b which are disposed coaxial with each other in the spring accommodating chamber 44. The small diameter spring 43b is located inside the large diameter spring 43a. The spring holding member 37 can be biased in a direction to reduce the volume of the pressure control chamber 36 under the biasing force of the springs 43a, 43b. The large diameter spring 43a is fitted in its compressed state with a predetermined set load between the annular side wall of the flange section 39 of the spring holding member 37 and the annular side wall 1a defining the hole section 5B. The small diameter spring 43b is fitted in its compressed state with a predetermined set load between the annular side wall of the flange section 39 and an annular stopper 145 which extends radially outwardly and movable by a predetermined distance in the axial direction of the springs 43a, 43b.

Figure 13:
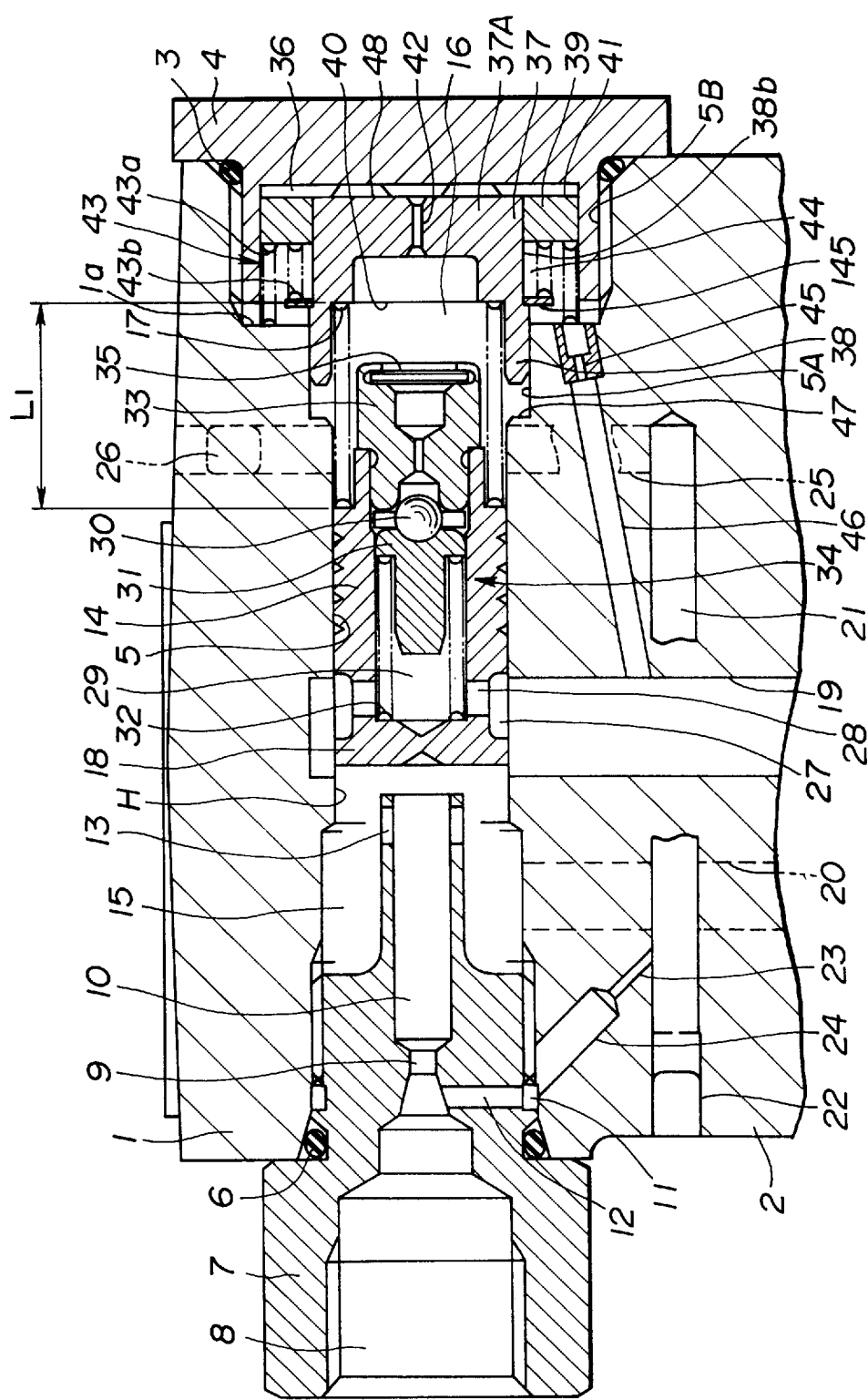
FIG. 13 is a fragmentary vertical sectional view of a fourth embodiment of the flow control device according to the present invention, showing an operational mode of the device.

The annular stopper 145 is slidably fitted on an annular groove 37B formed on the outer peripheral surface of the body section 37A of the spring holding member 37. The annular groove 37B has an axial dimension smaller than that of the spring accommodating chamber 44 defined between the wall 1a and the flange section 39 of the spring holding member 37. The annular stopper 145 is slidable along the surface of the annular groove 37B in the axial direction of the spring holding member 37. Accordingly, the stopper 145 is stopped at a position not to be in contact with the annular wall 1a when the spring holding member 37 is located at its rightmost position as shown in FIG. 13. Thus, in the state of FIG. 13, the large diameter spring 43a exerts a biasing force onto the spring holding member 37, while the small diameter spring 43b exerts no biasing force onto the spring holding member 37 thereby making no contribution to movement of the spring holding member 37.

It will be understood that the small diameter spring 43b can exert an effective biasing force onto the spring holding member 37 only after the annular stopper 145 is brought into contact with the annular wall 1a upon movement of the spring holding member 37 toward the spool valve 14 or leftward in FIG. 13.

This embodiment flow control device F is similar in construction to the first embodiment flow control device except for the structure of the spring 43 (including the springs 43a, 43b), and therefore the manner of operation of this embodiment will be discussed mainly on the effects of the spring 43.

Figure 18:
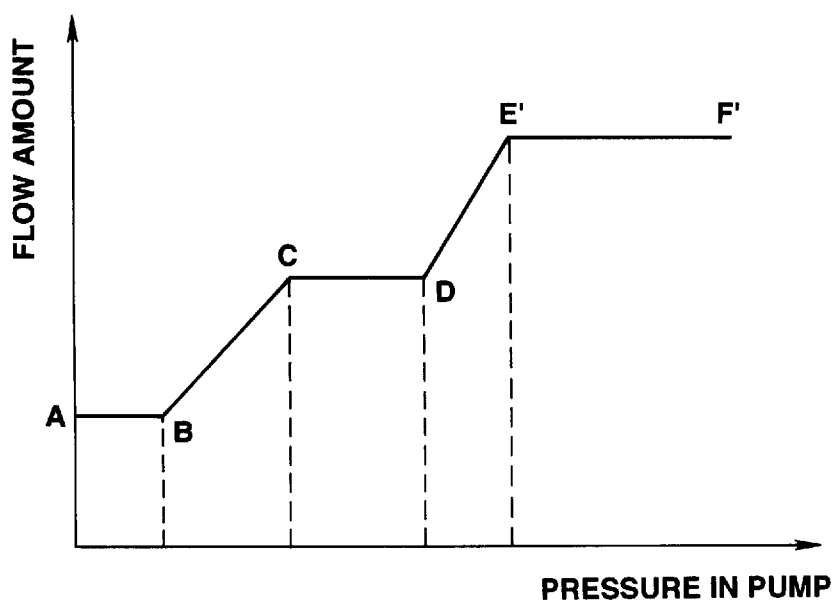
FIG. 18 is a graph of a flow amount characteristics obtained by the device of FIG. 13.

When the pressure in the discharge passage 8 is low below the predetermined level, the pressure (transmitted from the discharge passage 8 through the second pressure chamber 16) in the pressure control chamber 36 is low and therefore the spring holding member 37 is in the rightmost position as shown in FIG. 13 where the projections 48 are brought into contact with the inner wall surface of the plug 4. As a result, the set length of the control spring 17 takes the maximum value so that the biasing force (set load) of the control spring 17 is decreased. Accordingly, the spool valve 14 is controlled under the action of the control spring 17 whose set load is decreased, so that the flow amount characteristics of hydraulic fluid passing through the restricting orifice 9 becomes one indicated by the segment A-B in FIG. 18 which shows a variation in flow amount of hydraulic fluid passing through the restricting orifice 9 in terms of discharge pressure of (or pressure in) the hydraulic fluid pump. The flow amount characteristics of the segment A-B corresponds to that in case no force for assisting a driver's steering effort is required in the power steering system, or in case the steering wheel is not rotated to turn the road wheels of the vehicle.

At this time, the large diameter spring 43a is contacted at its one end with the annular wall 1a of the housing 1 so as to exert its axial biasing force onto the spring holding member 37, while the small diameter spring 43b is contacted at its one end with the annular stopper 145 so as not to exert its axial biasing force onto the spring holding member 37 as shown in FIG. 13. Consequently, the combination of the springs 43a, 43b bias the spring holding member 37 toward the plug 4 under its minimum biasing force.

Figure 14:
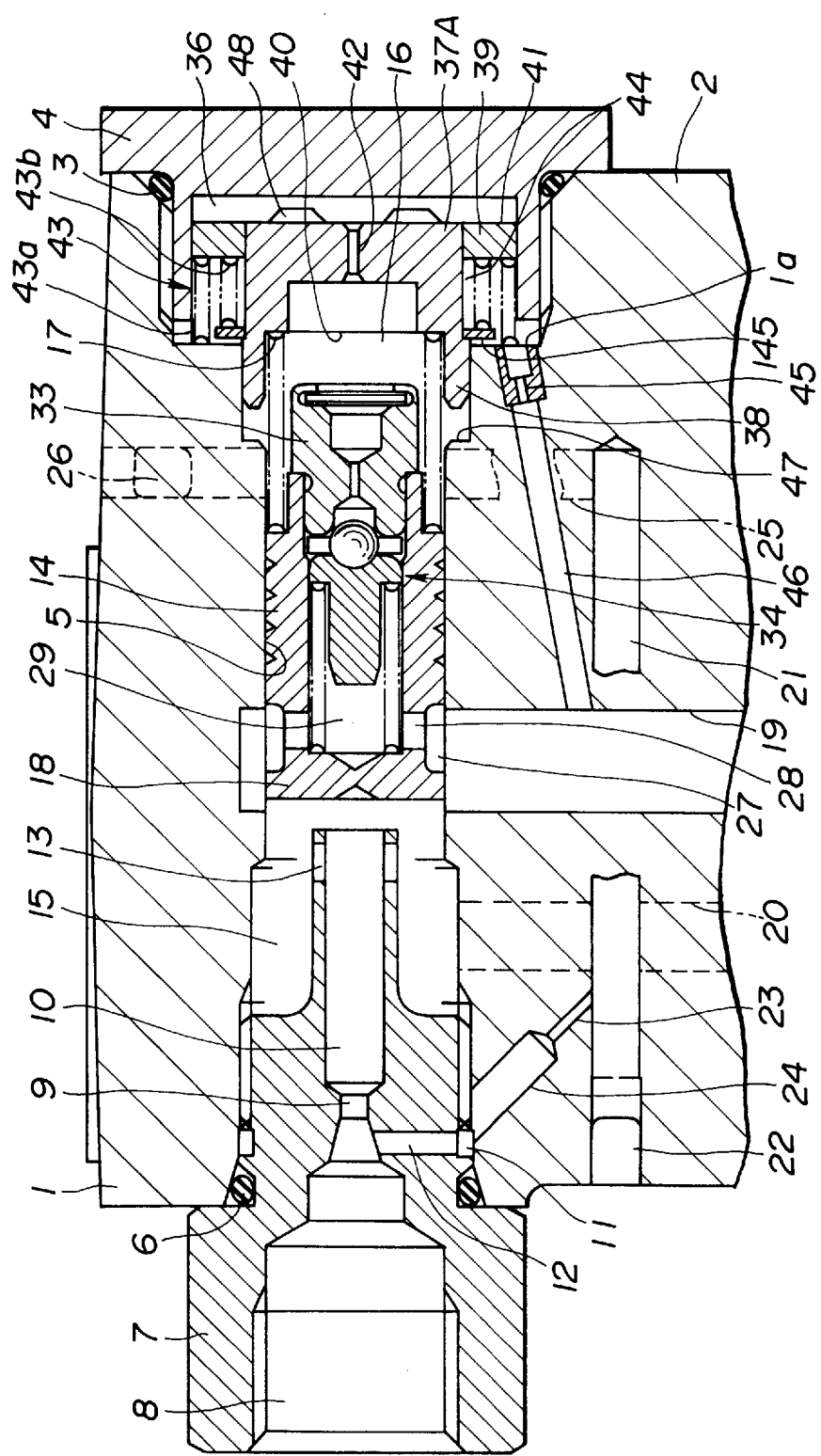
FIG. 14 is a sectional view similar to FIG. 13 but showing another operational mode of the device of FIG. 13.

When the actuator of the power steering system begins to be operated upon rotation of the steering wheel, the pressure in the discharge passage 8 is introduced into the second pressure chamber 16 through the through-hole 12, the peripheral groove 11, the inclined hole 24, the pressure-responsive orifice 23, the passage 21 and the passage 25, and then introduced through the passage 42 into the pressure control chamber 36. As a result, the pressure in the pressure control chamber 36 rises, so that the spring holding member 37 moves toward the spool valve 14 against the biasing force of the springs 43a, 43b as shown in FIG. 14. At this time, the control spring 17 is gradually compressed thereby gradually increasing the set load of the control spring 17. Accordingly, the spool valve 14 is controllably axially moved in accordance with the slightly increased biasing force of the control spring 17 and the pressure differential between the upstream and downstream sides of the restricting orifice 9. As a result, the flow amount of hydraulic fluid passing through the restricting orifice 9 becomes one indicated by a segment B-C in FIG. 18. Also at this time, only the large diameter spring 43a exerts its biasing force onto the spring holding member 37 thereby exhibiting a first stage biasing force of the spring 43 as shown in FIG. 14.

Figure 15:
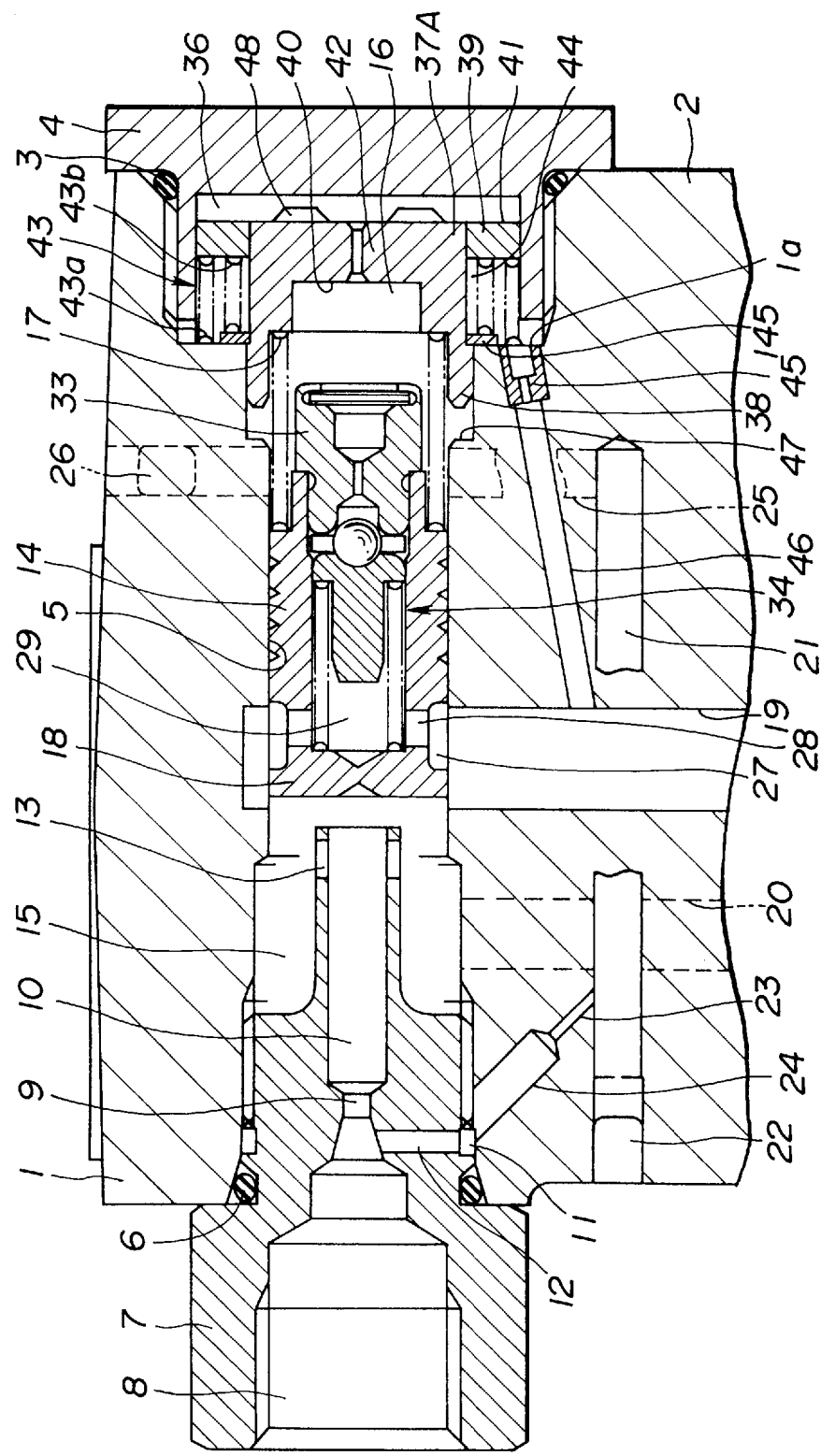
FIG. 15 is a sectional view similar to FIG. 13 but showing a further operational mode of the device of FIG. 13.

The spring holding member 37 is maintained at a position obtained upon balance of the pressure in the pressure control chamber 36 and the maximum value of the first stage biasing force of the spring 43 (corresponding to the biasing force of the large diameter spring 43a) before the spring 43 exhibits a second stage biasing force (discussed below) upon the pressure in the control pressure chamber 36 having reached a predetermined level, i.e., before the small diameter spring 43b exhibits its biasing force upon the stopper 145 being brought into contact with the annular wall 1a of the housing 1, as shown in FIG. 15. At this position of the spring holding member 37, the set load of the control spring 17 takes a predetermined level. Accordingly, the spool valve 14 accomplishes a flow control of hydraulic fluid in accordance with the predetermined biasing force of the control spring 17 and the pressure differential between the upstream and downstream sides of the restricting orifice 9. As a result, the flow amount of hydraulic fluid passing through the restricting orifice 9 becomes one indicated by a segment C-D in FIG. 18. This flow amount corresponds to that of hydraulic fluid to be supplied to the actuator of the power steering system at the time when the steering wheel is rotated to turn the road wheels during a high (vehicle) speed cruising. At this time, the large diameter spring 43a is compressed to a degree at which the stopper 145 is brought into contact with the annular wall 1a, so that the spring 43 exhibits the maximum first stage biasing force for the spring holding member 37 as shown in FIG. 15.

Figure 16:
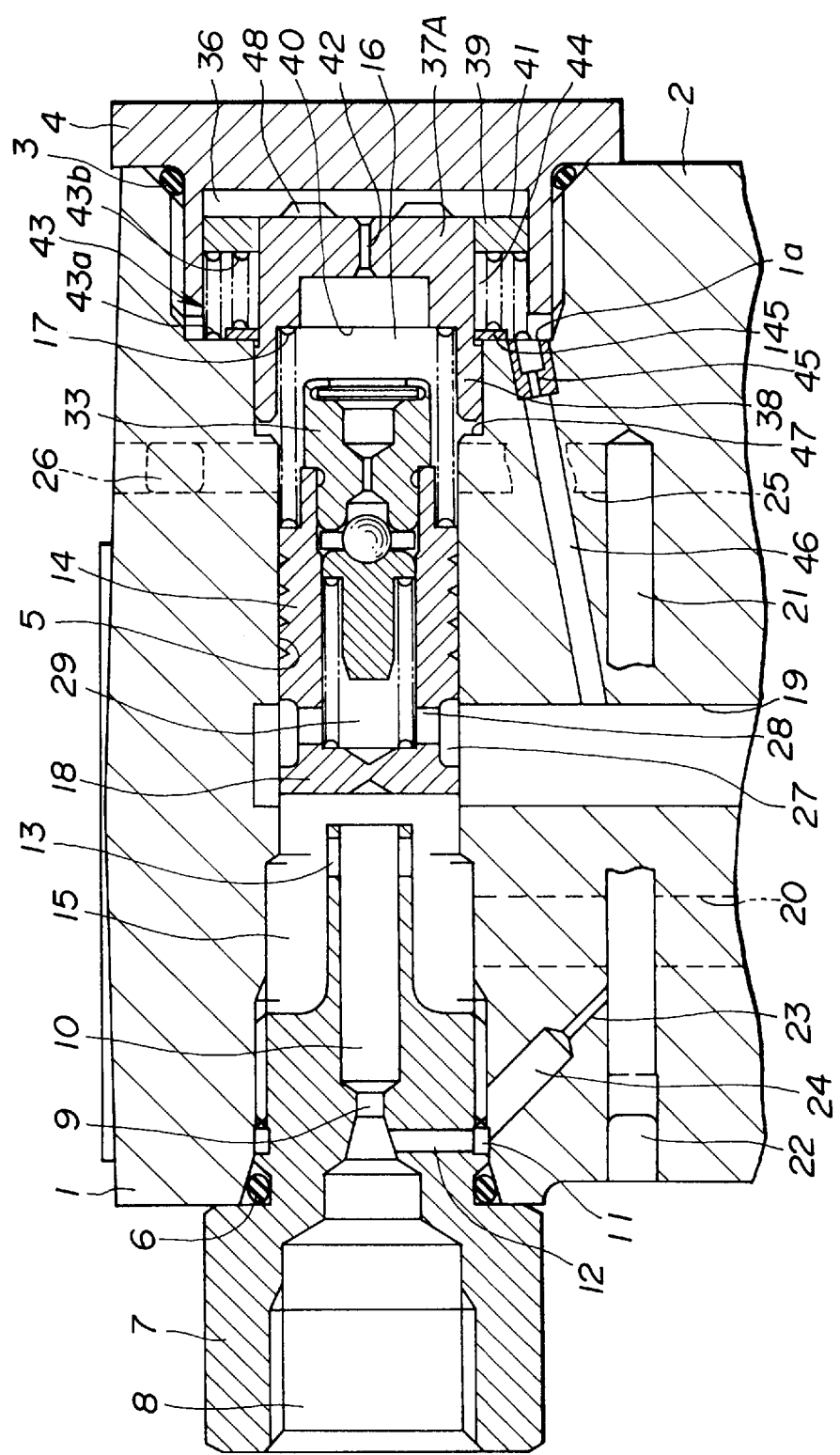
FIG. 16 is a sectional view similar to FIG. 13 but showing a still further operational mode of the device of FIG. 13.

When the pressure in the pressure control chamber 36 further increases so as to exceed the maximum first stage biasing force of the spring 43, the spring holding member 37 is further moved toward the spool valve 14 against the second stage biasing force of the spring 43, so that the control spring 17 is gradually further compressed thereby gradually increasing the set load of the spring 43 as shown in FIG. 16. Consequently, the spool valve 14 is controllably moved in accordance with the increased biasing force of the control spring 17 and the pressure differential between the upstream and downstream sides of the restricting orifice 9. As a result, the flow amount of hydraulic fluid passing through the restricting orifice becomes one indicated by a segment D-E' in FIG. 18. At this time, the spring 43 exhibits the second stage biasing force since not only the large diameter spring 43a exerts its biasing force but also the small diameter spring 43b exerts its biasing force onto the spring holding member 37 upon the stopper 45 being brought into contact with the annular wall 1a of the housing 1 so as to compress the small diameter spring 43b, as shown in FIG. 16.

Figure 17:
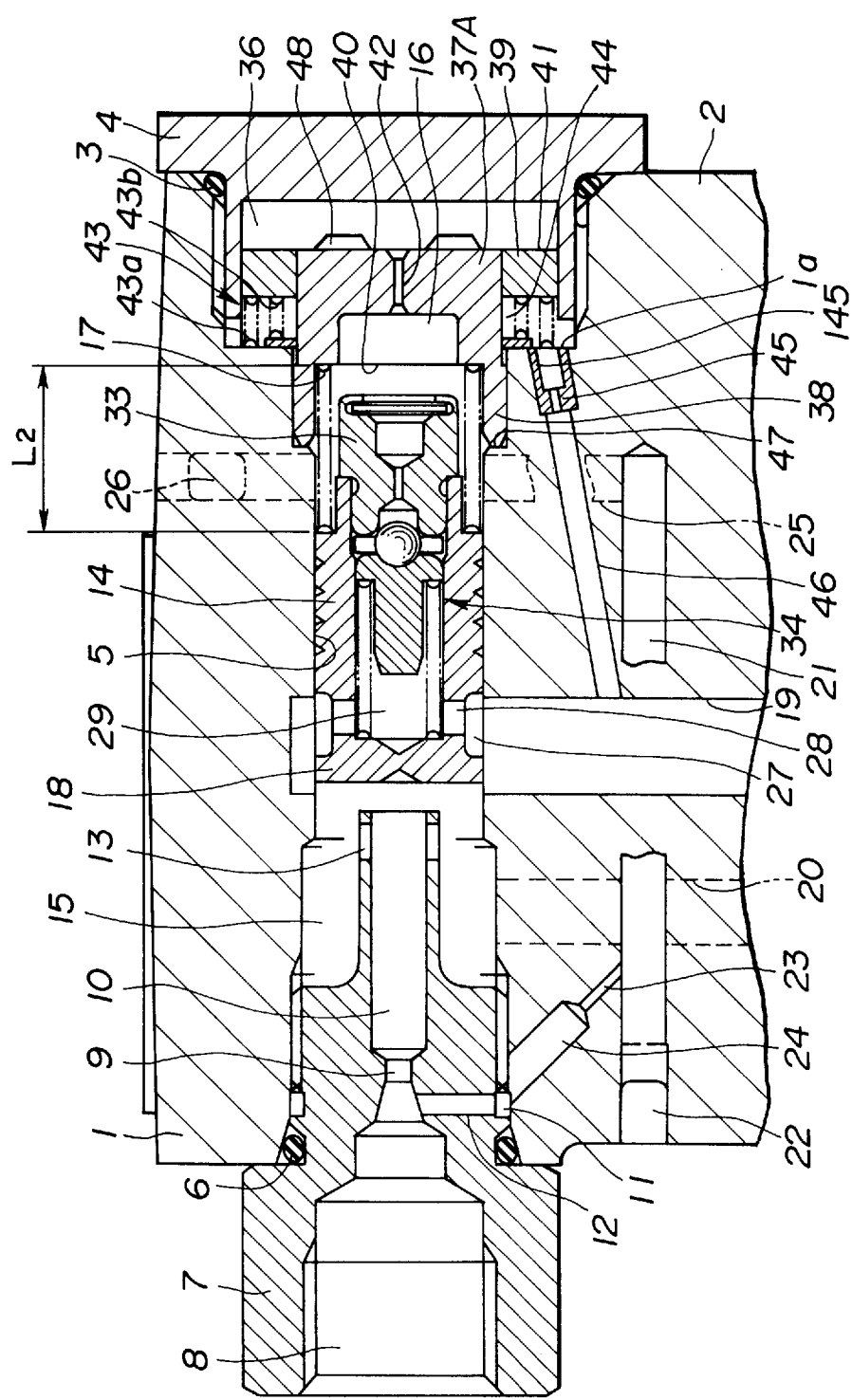
FIG. 17 is a sectional view similar to FIG. 13 but showing a still further operational mode of the device of FIG. 13.

When the pressure in the pressure control chamber 36 has reached a predetermined high pressure, the spring holding member 37 is further moved toward the spool valve 14 to obtain the maximum volume of the pressure control chamber 36, so that the tip end of the cylindrical section 38 of the spring holding member 37 comes into contact with the annular wall 47 defining the hole section 5A of the hole H. As a result, the set load of the control spring 17 becomes the maximum as shown in FIG. 17. In this state, the spool valve 14 is moved to accomplish a flow control of hydraulic fluid in accordance with the biasing force of the control spring 17 and the pressure differential between the upstream and downstream sides of the restricting orifice 9. Consequently, the flow amount of hydraulic fluid passing through the restricting orifice 9 becomes one indicated by a segment E'-F' in FIG. 18. This flow amount corresponds to the maximum flow amount of hydraulic fluid to be supplied to the actuator of the power steering system when the steering wheel is rotated to turn the road wheels during a vehicle cruising at a low vehicle speed. At this time, the large and small diameter springs 43a, 43b are compressed to the maximum degree thereby exerting the maximum biasing force of the multiple stages of the biasing forces onto the spring holding member 37 as shown in FIG. 17.

While the small diameter spring 43b has been shown and described as being supported at its one end by the movable stopper 145, it will be appreciated that the movable stopper may be omitted in which the free length of the small diameter spring 43b is such that one end of the small diameter spring 43b cannot contact with the annular wall 1a defining the hole section 5B when the spring holding member 37 is in a position to minimize the volume of the pressure control chamber 36, thereby obtaining a spring biasing force which can change stepwise.

What is claimed is:

1. A flow control device comprising:

means defining an axially extending hole;

a spool valve movably disposed in said hole and having first and second ends;

means defining a first pressure chamber in said hole, in cooperation with the first end of said spool valve, a drain passage being opened to said first pressure chamber and closable with said spool valve;

means defining a second pressure chamber in said hole, in cooperation with the second end of said spool valve;

means defining a restricting orifice communicated with said first pressure chamber, an introduction passage being communicated through said restricting orifice with a discharge passage and being opened to said first pressure chamber;

means by which pressure in the discharge passage is introduced to said second pressure chamber; and a first spring disposed in said second pressure chamber to bias said spool valve in a direction to close the drain passage;

wherein said second pressure chamber defining means includes a spring holding member movably and coaxially disposed in said second pressure chamber, said spring holding member having a first end face defining said second pressure chamber, and a second end face which is larger in pressure-receiving area than said first end face, said first spring being disposed between said spool valve and the first end face of said spring holding member; and said flow control valve further comprises means defining a pressure control chamber communicated with said second pressure chamber, in cooperation with the second end face of said spring holding member, and a second spring for biasing said spring holding member in a direction to reduce a volume of said pressure control chamber.

2. A flow control device as claimed in claim 1, wherein said pressure control chamber is larger in cross-sectional area than said second pressure chamber.

3. A flow control device as claimed in claim 1, wherein said first and second springs are disposed coaxial with each other.

4. A flow control device as claimed in claim 1, wherein said restricting orifice defining means includes means defining a main orifice and a sub-orifice formed coaxial with said main orifice, said main orifice being constant in opening area, said sub-orifice being variable in opening area in accordance with a flow amount of a fluid in the introduction passage.

5. A flow control device as claimed in claim 4, wherein said first pressure chamber defining means includes a connector having the discharge passage, wherein said main orifice and sub-orifice defining means is formed in said connector.

6. A flow control device as claimed in claim 5, wherein said connector includes means defining a spool valve hole;

a sub-spool valve movably disposed in said spool valve hole and having the main orifice through which said first pressure chamber is in communication with the discharge passage, said sub-spool valve being axially movable in response to pressure of the fluid in the introduction passage; and means defining said sub-orifice between an inner surface of said spool valve hole and an outer peripheral surface of said sub-spool valve, the first pressure chamber being communicable with the discharge passage through said sub-orifice.

7. A flow control device as claimed in claim 1, further comprising means for controlling movement of said spring holding member toward said spool valve in accordance with an operating condition of a vehicle equipped with said flow control valve.

8. A flow control device as claimed in claim 7, wherein said spring holding member movement controlling means includes means for controlling the movement of said spring holding member in accordance with a vehicle speed.

9. A flow control device as claimed in claim 7, wherein said controlling means includes an eccentric cam to which said spring holding member is axially contactable, and driving means for rotatingly driving said eccentric cam in accordance the vehicle operating condition.

10. A flow control device as claimed in claim 9, wherein said driving means includes a step motor.

11. A flow control device as claimed in claim 1, wherein said second spring including means for stepwise increasing a biasing force of said second spring as said spring holding member moves in a direction to increase the volume of said pressure control chamber.

12. A flow control device as claimed in claim 11, wherein said second spring includes first and second coaxial coil springs which are different in free length from each other.

* * * * *